US012149005B2

(12) United States Patent
Gardner

(10) Patent No.: US 12,149,005 B2
(45) Date of Patent: Nov. 19, 2024

(54) PHASED-ARRAY ANTENNA WITH PRECISE ELECTRICAL STEERING FOR MESH NETWORK APPLICATIONS

(71) Applicant: MeshPlusPlus, Inc., Chicago, IL (US)

(72) Inventor: Daniel Gardner, Glenview, IL (US)

(73) Assignee: MeshPlusPlus, Inc., Chicago, IL (US)

( * ) Notice: Subject to any disclaimer, the term of this patent is extended or adjusted under 35 U.S.C. 154(b) by 448 days.

(21) Appl. No.: 17/468,840

(22) Filed: Sep. 8, 2021

(65) Prior Publication Data

US 2023/0074075 A1 Mar. 9, 2023

(51) Int. Cl.

| | |
|---|---|
| ***H01Q 3/36*** | (2006.01) |
| ***H01Q 3/26*** | (2006.01) |
| *H01Q 1/48* | (2006.01) |
| *H01Q 9/32* | (2006.01) |

(52) U.S. Cl.

CPC ................ *H01Q 3/36* (2013.01); *H01Q 3/26* (2013.01); *H01Q 1/48* (2013.01); *H01Q 9/32* (2013.01)

(58) Field of Classification Search

CPC .. H01Q 3/36; H01Q 3/26; H01Q 9/32; H01Q 21/00

USPC ................................................. 342/372, 368

See application file for complete search history.

(56) References Cited

U.S. PATENT DOCUMENTS

| | | | | |
|---|---|---|---|---|
| 4,445,119 A * | 4/1984 | Works | H01Q 3/36 | 342/372 |
| 5,563,609 A * | 10/1996 | Wachs | H01Q 1/288 | 342/425 |
| 5,734,349 A * | 3/1998 | Lenormand | H04B 7/18515 | 342/372 |
| 6,583,760 B2 * | 6/2003 | Martek | H01Q 5/42 | 343/820 |
| 9,735,469 B1 * | 8/2017 | West | H01Q 3/2682 | |
| 9,774,384 B2 * | 9/2017 | Yun | H01Q 25/007 | |
| 10,574,319 B2 * | 2/2020 | Polehn | H04L 5/001 | |
| 11,804,889 B2 * | 10/2023 | Alavi | H04B 7/0697 | |
| 2019/0089433 A1 * | 3/2019 | Polehn | H04B 7/0617 | |
| 2023/0395994 A1 * | 12/2023 | Zhang | H04B 7/0608 | |

FOREIGN PATENT DOCUMENTS

WO WO-9311582 A1 * 6/1993 ............... H01Q 1/38

* cited by examiner

*Primary Examiner* — Chuong P Nguyen

(74) *Attorney, Agent, or Firm* — MARSHALL, GERSTEIN & BORUN LLP

(57) ABSTRACT

A steerable antenna device for a reconfigurable wireless mesh network comprises a directionally-disordered quasi-uniform two-dimensional array including a plurality of antenna elements attached to the substrate. The steerable antenna device further comprises a plurality of switches for each one of the plurality of antenna elements, the switches configured to select, for each of the antenna elements, a respective phase delay from a respective set of possible phase delays by selecting a respective path from a set of possible respective paths in the network of antenna feed traces.

20 Claims, 11 Drawing Sheets

PHASED-ARRAY ANTENNA WITH PRECISE ELECTRICAL STEERING FOR MESH NETWORK APPLICATIONS

FIELD OF THE DISCLOSURE

The present disclosure generally relates to reconfigurable wireless networks and, more particularly, to steerable antenna devices for implementing node-to-node and backhaul communications in wireless mesh networks.

BACKGROUND

Wireless mesh networks can bring flexible Internet connectivity to outdoor environments. A mesh network includes multiple wireless nodes, at least some of which are connected to each other, along with nodes that are "wired" into the Internet for backhaul communication. One advantage of the mesh networks is their resilience. When one node malfunctions, the wireless traffic can be automatically rerouted through other nodes.

Network scalability of mesh networks, however, remains a significant challenge. Particularly, throughput loss per hop can lead to significant performance degradation as the coverage area and number of nodes increases. Because a communication path between an access node of a mesh network and a node connected to the Internet may include multiple hops between adjacent nodes, losses from each hop multiply, leading to exponential signal loss from multiple hops. At least in part, the losses for each hop stem from radio interference (e.g., from neighboring nodes). Better radios, and, in particular, antenna devices can ameliorate interference problems to improve performance.

SUMMARY

The antenna devices and techniques described in this disclosure can improve wireless mesh network performance at least in part by reducing radio interference among distinct node links. In particular, an antenna array may be configured with a discrete set of phase options for each antenna element and directionally-disordered antenna placement to steer direction and/or directivity while substantially minimizing radiation pattern side lobes.

In one implementation, a steerable antenna device for a reconfigurable wireless mesh network comprises a substrate including a network of antenna feed traces connected to a primary feed port. The steerable antenna device further comprises a directionally-disordered quasi-uniform two-dimensional array including a plurality of antenna elements attached to the substrate, the array configured to operate at an operating wavelength. Still further, the steerable antenna device comprises a plurality of switches for each one of the plurality of antenna elements, the switches configured to select, for each one of the plurality of antenna elements, a respective phase delay from a respective set of possible phase delays by selecting a respective path from a set of possible respective paths in the network of antenna feed traces. Additionally, the steerable antenna device comprises a controller configured to: i) obtain a pointing direction of the steerable antenna array, and ii) control the switches to select, for each one of the plurality of antenna elements, the respective phase delay based on the obtained pointing direction of the steerable antenna device.

DETAILED DESCRIPTION

The methods and devices described in this disclosure can improve operation of radio devices for wireless mesh networks. Mesh network radio devices can include steerable antenna arrays which can have radiation patterns with a main lobe in a certain pointing direction, configured by selecting a carrier phase from a set of possible phases for each antenna element. Radiation pattern side lobes, however, can cause interference which, in turn, can increase signal loss or decrease throughput (e.g., cause increased bit error rates, dropped packets, etc.).

To ameliorate throughput degradation, steerable antenna devices can be configured to substantially minimize radiation pattern side lobes. One approach, described in the present disclosure, includes introducing directional disorder in an antenna array. A directionally disordered array includes elements that are arranged in no particular direction, i.e. statistical difference between any two directions is substantially minimized. For example, the antenna elements in the array are not arranged in lines, rectilinear grids, nor with any other Cartesian regularity. One implementation includes arranging antenna elements along a Fermat spiral at incremental azimuthal intervals determined by the golden ratio (i.e., the golden angle), as described below.

Figure 1A:
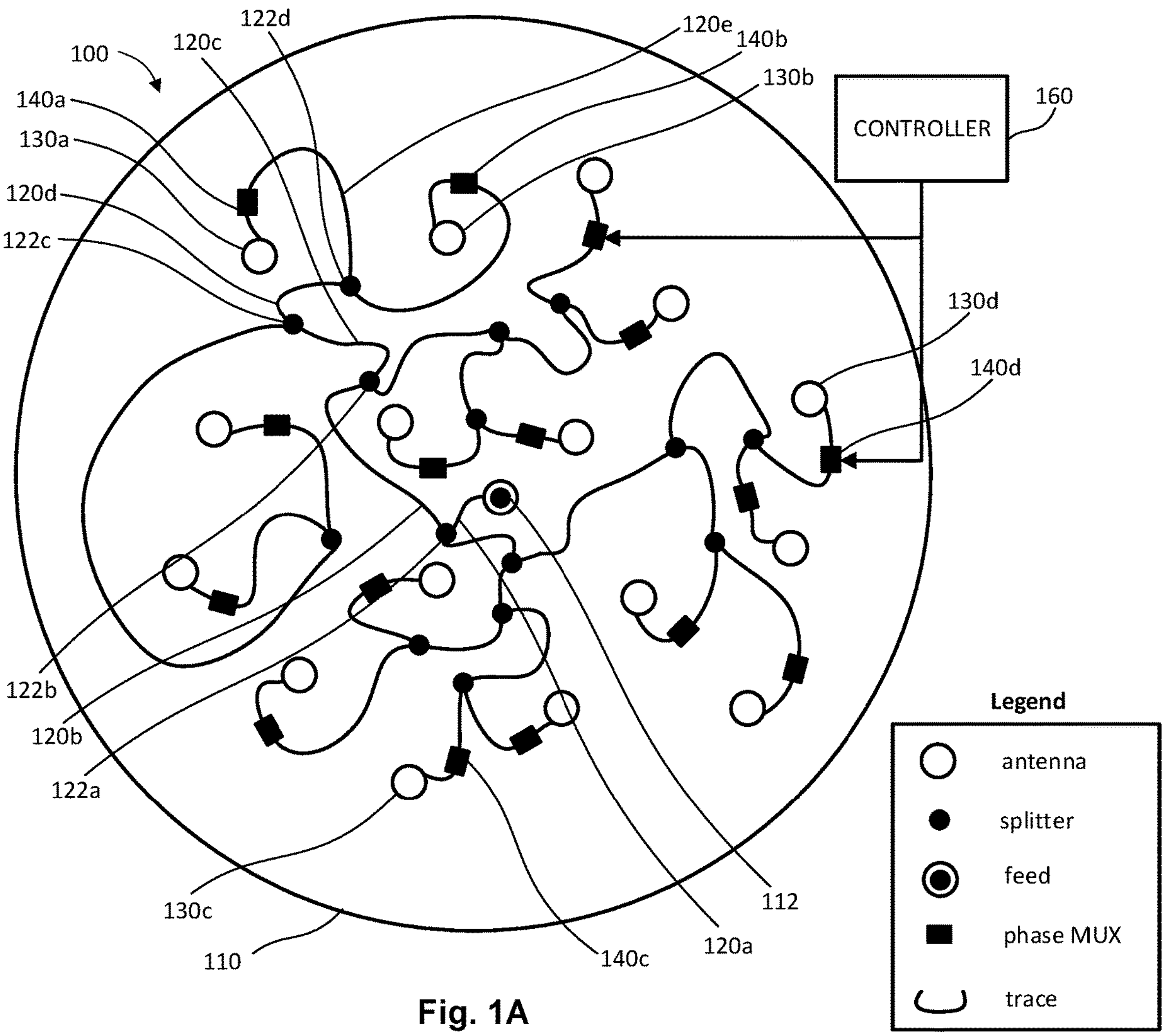
FIG. 1A illustrates a steerable antenna device for a reconfigurable wireless mesh network.

FIG. 1A illustrates a steerable antenna device 100 for a reconfigurable wireless mesh network. The steerable antenna device 100 is configured to control, at a given time, one or more primary radiation directions of emitted radio signals and/or directional sensitivity to received radio signals. The steerable antenna device 100 may be configured to operate at one or more operating wavelengths.

Figure 1B:
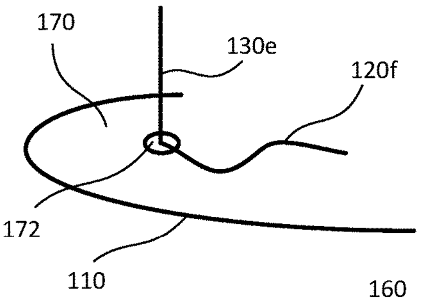
FIG. 1B illustrates an example implementation with a monopole antenna of one of the antenna elements in the steerable antenna device of FIG. 1A.
Figure 1C:
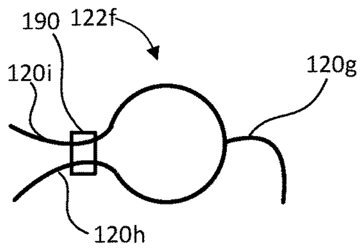
FIG. 1C illustrates a power divider element that may bifurcate a trace in a network of antenna feed traces.
Figure 1D:
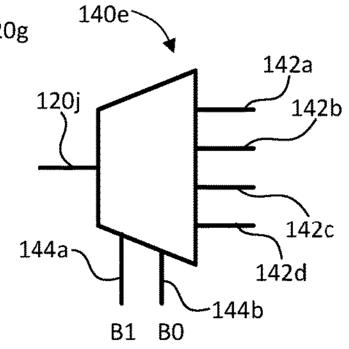
FIG. 1D illustrates a phase multiplexer for selecting a phase delay from a set of possible phase delays for each antenna element in the steerable antenna device.

The steerable antenna device 100 includes a substrate 110 at which a primary feed port 112 and a network of antenna feed traces, such as traces 120*a-e* of FIG. 1A and traces 120*f-j* of FIGS. 1B-D, are disposed. The traces 120*a-e* are electrically connected to the primary feed port 112 and to an array of antenna elements (marked with open circles, but, to avoid clutter, not all labeled) or, simply, antennas (e.g., antennas 130*a-d*). For example, the traces 120*a-e* connect the center feed port 112 to the antenna element 130*a* via a series of power dividers 122*a-d* (also referred to as splitters 122*a-d*) and a phase multiplexor (MUX) 140*a* implemented with switches as described in more detail below. Generally, each of the antennas 130*a-d* has a corresponding multiplexer 140*a-d* configured to select a respective phase delay for the corresponding antenna.

A controller 160 may be configured to control each of the multiplexers 140*a-d* to select, for each antenna, a respective phase delay by selecting among alternative paths between the primary feed port 112 and the antenna element. The controller may select a path in view of an intended radiation direction, other radiation pattern constraints, and one or more operating wavelength.

The legend in FIG. 1A shows symbols corresponding to the primary feed port 112, antennas (e.g., antennas 130*a-d*), traces (e.g. traces 120*a-e*), the splitters, and the multiplexers. Only a portion of the traces, the antennas, the splitters and the multiplexers are enumerated to avoid clutter. The antennas (including antennas 130*a-d*) of the device 100 may be disposed at the substrate 110 in a directionally-disordered quasi-uniform manner as described in more detail in the context of FIGS. 2A-C. In other implementations, the antennas of the device 100 may be directionally-disordered and with varying uniformity across the substrate 110. For example, closer to the center of the substrate 110, the antennas may be closer or farther spaced than the antennas that are closer to the edge of the substrate 110.

The substrate 110 in FIG. 1A may be made from any suitable electrically non-conductive material. In some implementations, for example, the substrate 110 can be made from a printed circuit board (PCB) material, such as FR-4. In other implementations, the substrate 110 may be a semiconductor wafer. In other implementations, the substrate may be substantially metallic, with isolation regions around antennas. The substrate 110 may have a planar disk shape or may curve in three dimensions (e.g., to form a dome shape), as described in more detail below. The substrate 110 may be monolithic or constructed from multiple segments.

Traces (e.g., traces 120*a-j*) may, for example, be printed, machined (e.g., by removing part of a metallic layer), or lithographically defined on the substrate 110. The traces may implement transmission lines (e.g., coplanar, microstrip, etc.) with suitable characteristic impedances (e.g. 25, 50, 75, 100Ω, etc.). In some implementations, as illustrated in FIG. 1A, the network of traces may form a bifurcating tree to connect the primary feed port 112 to $2^N$ antenna elements. In such an implementation, a series of traces connecting the primary feed port 112 to an antenna may include N two-way splitters. For example, the path to antenna 130*a*, one of 16 or $2^4$ antenna elements in the antenna device 100 includes the four splitters 122*a-d*. In some implementation, three-way, four-way, or any other suitable splitters may divide power within the network of traces.

Traces may be configured to meander along the substrate 110 to have equal cumulative lengths between the primary feed port 112 and each of the antenna elements (i.e., antenna element feeds). Alternatively, total paths lengths to antenna feeds may vary by integral number of wavelengths (in the transmission lines). Still alternatively, the total path lengths may vary by fractions of wavelengths and may be compensate by the phase-selecting MUXs, as discussed in more detail below.

Antenna elements (e.g., 130*a-e*), splitters (122*a-d*), MUXs (140*a-d*) are discussed in more detail with reference to, respectively, FIGS. 1B-D.

Although the device 100 is illustrated in FIG. 1A with the single primary feed port 112, a device with dedicated feed ports for each antenna element, or, even, a dedicated radio-frequency transmitter at each antenna element may be configured to operate according to similar principles. Specifically, the path between each antenna element and a corresponding feed port may include a phase-selecting multiplexer or another suitable tunable phase or time delay controlled by a controller in view of one or more selected radiation directions.

FIG. 1B illustrates an example implementation with a monopole antenna 130*e* of an element in the steerable antenna device 100 of FIG. 1A. The antenna 130*e* may be one of the antennas 130*a-d* or a different antenna. The monopole of the antenna 130*e* may be a quarter-wave monopole, or have any other suitable length in terms of a wavelength (e.g., 0.1, 0.2, 0.5, 0.75, 1.5 wavelength, etc.). The antenna 130*e* may be a variant of a monopole antenna, such as for example a T-antenna, a top hat antenna, or another capacitively loaded monopole. A trace 120*f* may be a transmission line feed of the antenna 130*e*.

Generally, antenna elements need not be monopoles. For example, antenna elements may be dipoles. In some implementations, the two halves of a dipole may be on opposite side of the substrate 110 (e.g., the plane of the substrate). In other dipole implementations, both halves of a dipole may be on the same side of the substrate, and a portion of the feed for the dipole may run along the length of the dipole, departing from the substrate 110 and electrically connecting to the trace feeding the antenna.

Still more generally, the antenna 130*e*, may have any suitable shape and need not be a monopole nor a dipole antenna. Furthermore, the antennas 130*a-e* (or, for that matter, any of the antennas in the device 100 need not be identical to one another. In the case of monopole implementations, monopole lengths or capacitive loading may vary. Still in some implementations, the antennas 130*a-e* may be of different types.

The substrate 110 may include a ground plane 170. The ground plane 170 and the monopole antenna 130*e* may together terminate a microstrip or a coplanar transmission line implementing the trace 120*f*. The ground plane 170 may be implemented on either or both sides of the substrate 110. In the implementations where the ground plane 170 is disposed at both sides of the substrate (or within the substrate), portions of the ground plane 170 may be electrically connected, for example, using vias. The substrate 110 may include an electrically insulating region 172, isolating the pole of the antenna 130*e* from the ground plane 110.

FIG. 1C illustrates a splitter element 122*f* that may bifurcate a trace 120*g* in a network of antenna feed traces. Specifically, the splitter 122*f* may spit the trace 120*g* into traces 120*h* and 120*i*. The splitter 112*f* may be a Wilkinson power divider implemented with quarter wave arc sections and a suitable resistor 123. In other implementations, other types of splitters may be used. For example, the splitters may be implemented with directional couplers, lumped elements, or any other suitable combination of transmission lines segments and/or lumped elements.

The splitters 122*a-f* need not be equal power splitters. For example, a 1:2 ratio splitter followed by 1:1 ratio splitter may equally partition power to three antenna elements. Furthermore, in some implementations, powers fed to distinct antenna elements (e.g., antennas 130*a-e*) may not be equal.

FIG. 1D illustrates a phase multiplexer 140*e* for selecting a phase delay from a set of possible phase delays for each antenna element in the steerable antenna device 100. In a sense, the MUX 140*e* is inserted into a trace 120*j*, adding one of four possible phase delays (142*a-d*) to the propagation phase delay of the trace 120*j*. The phase delays 142*a-d* may be loops or meandering sections within trace 120*j*, and can be thought of as alternative routes that a signal propagating along the trace 120*j* may take.

The phase delays 142*a-d* may be implemented with different length transmission line segments. Additionally or alternatively, the phase delays 142*a-d* may be implemented with filters. In either case, the amount of phase in each of the phase delays 142*a-d* may depend on the frequency of a radio signal. For narrowband signals, the variability of phase delays across the band can be negligible. On the other hand, phase delay variability with respect to wavelength may be designed for broadband operation. For example, a redundant number of phase delays, non-uniform distributions of phase delays, and engineered dispersion of the phase delays may help with broadband operation. Furthermore, rather than broadband operation across a range of wavelengths, the delays may be designed for a select group of two or more wavelengths.

The MUX 140*e* may include two digital selector inputs 144*a, b* corresponding to two selection bits B0 and B1. The selection bits can determine which of the phase delays 142*a-d* add to the total propagation phase delay of the trace 120*j*. Analogously, MUXs (e.g., MUXs 140*a-d*) for other antenna elements (e.g., antenna elements 130*a-d*) may have respective selector inputs for bits determining corresponding phase delays. The controller 160 may determine and send a two-bit selection to each MUX (e.g., MUXs 140*a-e*) in the device 100 to set one of four possible phases at each antenna element (e.g., antenna elements 130*a-e*) to implement a phased antenna array.

In general, MUXs may provide any suitable number of alternative paths. The number of possible paths to each antenna element may be a power of two. For example, a MUX selecting among eight paths may be implemented with three selector bits. Generally, the number of possible delays and selector bits may trade off phase resolution (which, as discussed below, may somewhat affect side lobe suppression ratio) and propagation loss in between a central feed and an antenna element. The propagation loss may be affected by the increased number of switches in any given feed path between the central feed and an antenna element, as described below.

The digital selector inputs 144*a,b* may be logical inputs using, for example, transistor-transistor logic (TTL) or diode-transistor logic (DTL), or complimentary metal-oxide (CMOS) integrated circuits. The digital selector inputs 144*a,b* may accept digital signals in parallel. In some implementations, on the other hand, two bits to determine a MUX phase may be sent to the MUX in series. Generally, the MUX may include electronics to select the phase based on a sequence of bits.

A radiation pattern of the device 100 set by the phases sent to the MUXs (e.g. MUXs 140*a-e*) by the controller 160 may depend on the spatial arrangement of the antenna elements (e.g., antenna elements 130*a-e*), the geometry of the antenna elements themselves, and the configuration of the substrate 110. In particular, regular structures (e.g., statistically anisotropic patterns), in the arrangement of antenna elements (e.g., antenna elements 130*a-e*) may lead to spurious maxima (i.e., lobes) in the radiation pattern of the device 100. Thus, reducing such regularities in structure may enable radiation patterns with large side-lobe suppression.

Figure 2A:
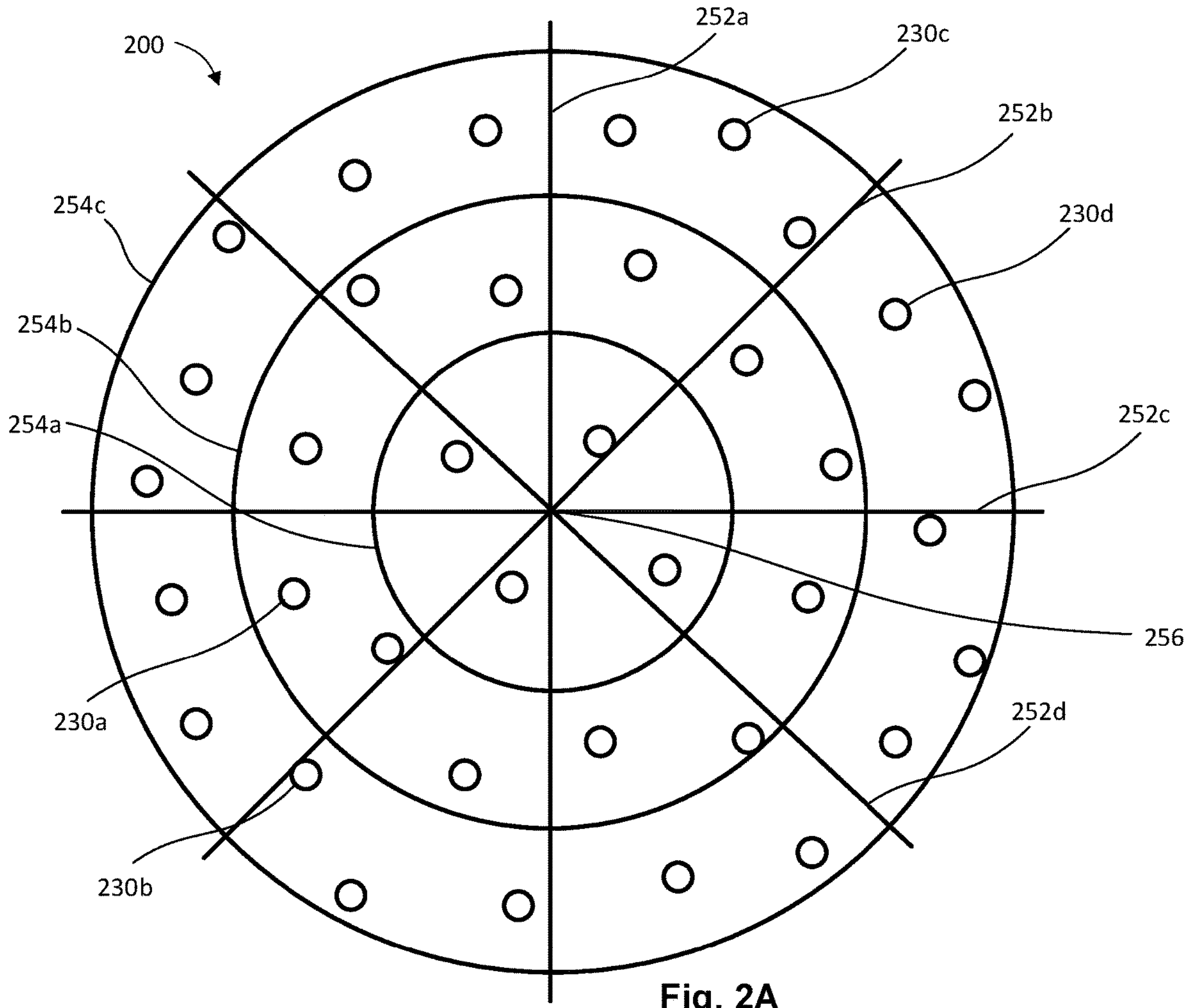
FIG. 2A illustrates an example of a directionally-disordered quasi-uniform two-dimensional array.

FIG. 2A illustrates an example of a directionally-disordered quasi-uniform two-dimensional array 200. Antenna elements arranged on a substrate (e.g., substrate 110) according to the pattern of the array 200 can have a considerably higher side-lobe suppression ratio than more regular antenna arrays. For example, the device 100 may have antenna elements (e.g., antenna elements 130*a-e*) arranged analogously to the array 200.

The elements of the array 200 (e.g., the elements 230*a-d*), represented by small open circles, are arranged to minimize directionality (i.e., directional order). For the purpose of illustration, four cardinal direction lines 252*a-d* and three concentric circles 254*a-c* partition the plane of the array 200 into eight slices and three annular regions. A center point 256 of the partition may be the first geometric moment of the array 200 or another suitable center point. With respect to the center point 256, the four cardinal lines 252*a-d* are uniformly distributed along the angular coordinate of a polar coordinate system centered at the center point 256. The concentric circles 254*a-c* are at uniformly increasing radii of the polar coordinates with respect to the center point 256.

The elements of the array 200 do not tend toward any one of the cardinal lines 252*a-d*, nor any intermediate direction. The angular distribution of the elements can be described as directionally disordered. A metric of directional disorder in the array 200 may be defined and used for constructing the array 200. For example, an optimization function may be constructed with the metric of directional disorder, possibly along with other optimization parameters. Such an optimization function, for example, may be a weighted sum or a weighted sum of squares of the various optimization parameters. In some implementations, the optimization function may be maximized using a search among various candidate array patterns. In other implementations, the optimization function may be maximized iteratively, using, for example, a gradient descent algorithm. Additionally or alternatively, an array (e.g., the array 200) may be selected based on achieving a metric of directional disorder that is above a predetermined threshold of the metric.

In some implementations, a metric of directional disorder may be an inverse of amplitude of correlation between radial and azimuthal coordinates (between 0 and 2π radians) of elements (e.g., the elements 230*a-d*). For example, a correlation coefficient of 0.1 would yield a higher directional disorder than a correlation coefficient of −0.5. A threshold correlation magnitude for sufficient directional disorder may be 0.1, 0.2, 0.3, 0.4, 0.5 or another suitable threshold.

In other implementations, the metric of directional disorder may be the measure of isotropy of the array (e.g., array 200). In other words, a directional disorder metric may be a metric reflective of the isotropy. One such metric may be variability in a histogram of elements with respect to azimuthal directions. For example, an eight-bin histogram may be constructed for the array 200 based on the sectors (i.e., wedges) between cardinal direction lines 252*a-d*. The number of elements in each such edge varies between four and five. In other implementations, a histogram may be constructed with overlapping bins. In any case, a metric of isotropy may be defined as relative variability among bin counts. A threshold isotropy metric for a directionally-disordered array (e.g., array 200) may be 10%, 20%, 30% or any other fraction of an average bin count.

Other metrics of directional disorder and/or isotropy may include a measure of entropy with respect to azimuthal position of array elements, variability of moments of array coordinates projected on cardinal direction lines (e.g., lines 252*a-d*), etc.

Besides directional disorder, the array 200 may be configured for quasi-uniformity. Generally, in a quasi-uniform array, the elements may be substantially evenly distributed over a region, albeit not on a regular grid. An array optimization function may include a metric of uniformity along with a metric for directional disorder.

One metric of uniformity or quasi-uniformity may be based on an inverse of relative variance among nearest-neighbor distances of array elements. An additional or alternative metric of uniformity may be based on modeling elements as having identical electrical charges. Then, for each element (e.g., elements 230*a-d*), the sum of virtual forces from all of the other elements, and, possibly, a boundary represented by a circularly-distributed charge may be calculated. A variance in the magnitudes of the virtual forces on each element, relative to the mean force, may be used as a measure of uniformity.

In yet another implementation, a local density at each element location may be calculated as a sum of values, at the location of the element, of isotropic kernels centered at the locations of the other elements. The effect of a circular boundary may be represented by an isotropic boundary function decreasing radially inward. The measure of uniformity may be derived from the statistical distribution of local densities.

Still another measure of uniformity may be based on a statistical distribution of Voronoi cells defined by array element locations. This measure is described in more detail with reference to FIG. 2C.

The mean density of elements within the array (e.g., array 200) may be set based on a number of considerations. For example, the density may be a trade-off between reducing coupling between neighboring antennas and device compactness. The density may be configured, for example, to ensure a minimum spacing between antenna elements with respect to a nominal wavelength. The minimum spacing may be 0.1, 0.2, 0.3, 0.4, 0.5, 0.6, 0.7, 0.8, 0.9, 1 or any other suitable multiplier of a nominal wavelength.

As discussed above, a suitable optimization algorithm may yield, based on the metrics above, a suitably directionally disordered and quasi-uniform array. In some implementations, however, locations of elements in a directionally-disordered quasi-uniform array may be determined directly using a closed-form equation, as discussed with reference to FIG. 2B.

Figure 2B:
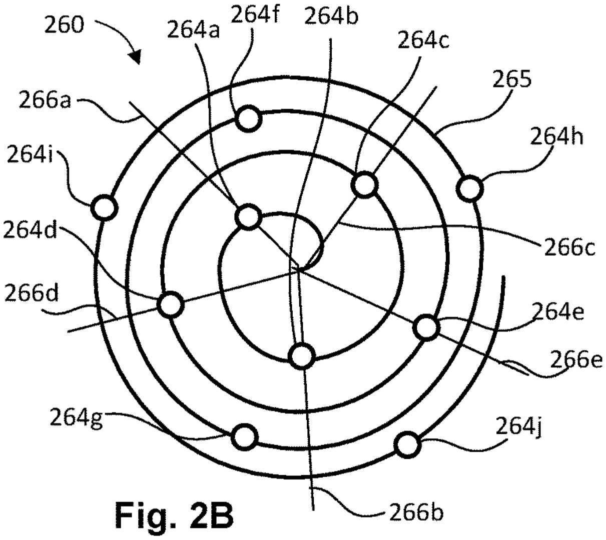
FIG. 2B illustrates an array disposed along a Fermat spiral at golden angle azimuthal intervals.

FIG. 2B illustrates an array 260 with elements 264*a-i* disposed along a Fermat spiral 265 at golden angle azimuthal intervals. To avoid clutter, only the first five azimuthal positions, i.e., for the elements 264*a-e*, are marked by radial line segments 266*a-e*. The azimuthal angle increases by fixed angle (e.g., golden angle) intervals between 266*a* and 266*b*, 266*b* and 266*c*, etc. Beyond 2π, i.e., for elements 264*d-i*, the azimuthal angles are equivalent to the corresponding modulo 2π values.

Mathematically, the Fermat spiral is given by the polar equation, $r=a\sqrt{\theta}$, with radius r varying as the square root of angle θ, and proportionally to a scaling constant a. One property of the Fermat spiral is that it encloses approximately equal areas with each subsequent loop (i.e., 2π increment in θ). The scaling constant, a, may be chosen to achieve a minimum spacing constraint as discussed above. Furthermore, the scaling constant may be selected in view of the intended operating wavelength or a set of operating wavelengths of the device.

The array 260 may be generated by placing elements at azimuthal position given by the equation, $\theta_n=\theta_0+n\theta_G$, where the n-th azimuthal position $\theta_n$ is the sum of the initial azimuthal position $\theta_0$ and n times the golden angle of $\pi(3-\sqrt{5})$ radians. As the golden angle is maximally irrational, the array 260, placed along the Fermat spiral 265 is directionally disordered.

In some implementations, the initial angle $\theta_0$ is zero. In other implementations, the initial angle may be chosen to optimize sideband rejection ratios in one or more radiation directions.

The array 260 has quasi-uniformity owing to the property of the Fermat spiral of enclosing substantially equal areas with every turn. Thus, each element (e.g., 264*a-i*) has approximately the same area apportioned to it as described, for example, in more detail with reference to FIG. 2C.

Figure 2C:
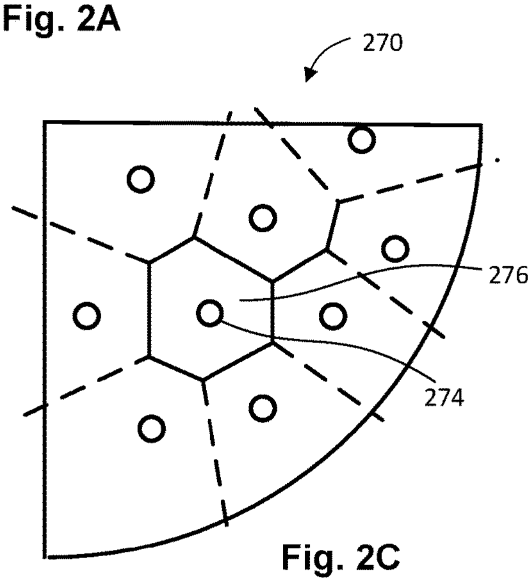
FIG. 2C illustrates a Voronoi partition of a portion of the array in FIG. 2A.

FIG. 2C illustrates Voronoi partition 270 of a portion of the array 200 in FIG. 2A. The portion of the array illustrated in FIG. 2A may be the bottom right portion of the array 200 bounded by the lines 252*a* and *c* and the circle 254*c*. For an example array element 274 the Voronoi the cell 276 is determined by the spatial relationship of neighboring elements. More specifically, the Voronoi cell 276 encloses a locus of all points that are closer to the element 274 than to other elements. Geometrically, the Voronoi cell may be defined by drawing line segments from the element 274 two the neighboring elements, and perpendicularly bisecting the line segments connecting the element 274 to the neighboring elements. The resulting convex polygon enclosing the elements 274 is the Voronoi cell 276. The Voronoi cell 276 in FIG. 2C, is the only complete Voronoi cell in the Voronoi partition 270. Other Voronoi cells are partially defined by the dashed lines. The finite extent of the illustrated part of the array 200, however, does not include other elements to close the Voronoi cells for elements other than the element 274. In some implementations, borders of outer quasi-Voronoi cells may be defined by predetermined boundaries, such as, for example, the circle 254.

An area of Voronoi cell may define the local density of the array at the location of the element corresponding to the Voronoi cell. For example, the local density may be defined as the inverse of the area of the Voronoi cell. In other implementations, the local density may be based on the Voronoi cell using another suitable algorithm. In summary, the array 200 may be designed using a quasi-uniformity measure based on Voronoi cell areas.

An array of antennas (e.g., the array 200) may be designed so that a mean (or median) of the distribution of Voronoi cell areas is within a certain range of values encompassing a target Voronoi cell area. The target Voronoi cell area may be given by $A_V = C\lambda^2$, where λ is an operating wavelength and C is a constant (e.g., 0.01, 0.02, 0.05, 0.1, 0.2, 0.5, 1, 2, etc.) selected to achieve desired spacing between antenna elements, as described above.

Figure 3A:
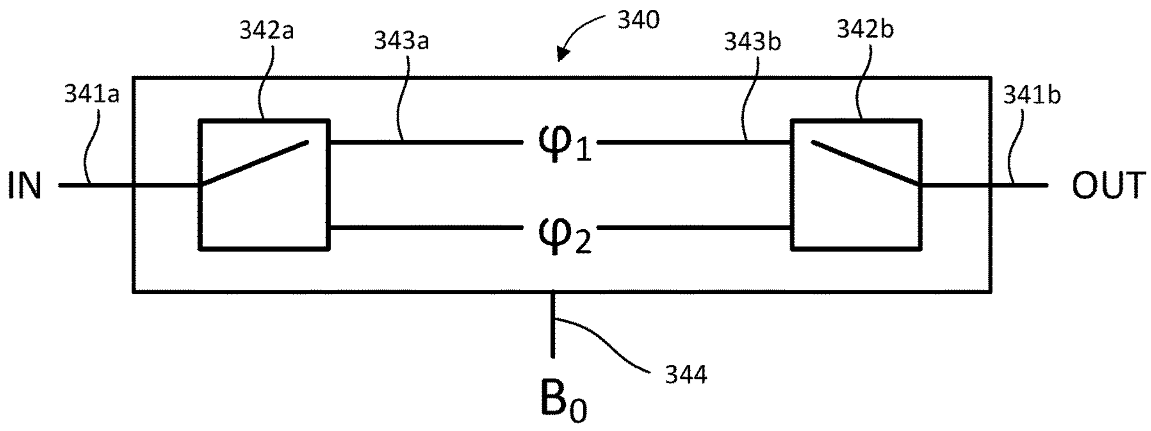
FIG. 3A illustrates an example multiplexer for one-bit selection between two phases.

FIG. 3A illustrates an example multiplexer 340 for one-bit selection between two phases. The multiplexer 340 may be an implementation of the multiplexer 140 in FIG. 1. The multiplexer 340 includes an input line 341*a* and an output line 341*b*, two single-pole double-throw switches 342*a,b*, two phase delay lines or, simply, delay lines 343*a,b*, and a digital selector line 344. The input and output lines 341*a, b* and/or the delay lines 343*a,b* may be implemented as traces on a suitable substrate. Alternatively, the input and output lines 341*a,b* and/or the delay lines 343*a,b* may be implemented as wires, optical fibers, or any other suitable connection. It should be noted that the phase delay lines 343*a, b* may depend on the frequency of the signal propagating through the multiplexer 340.

In one operating mode, the input line 341*a* may be electrically connected to the output line 341*b* via the switch 342*a*, the delay line 343*a*, and the switch 342*b*. In another operating mode, the input line 341 *a* may be electrically connected to the output line 341*a* via the switch 342*a*, the delay line 343*b*, and the switch 342*b*. A binary digital logic signal $B_0$ applied to the digital selector line 344 may select between the two operating regimes by controlling the switches 342*a,b*. That is, for example, when the signal $B_0$ at the digital selector line 344 is high (e.g., binary 1), the input line 341*a* may be electrically connected to the output line 341*b* via the phase delay line 343*a*. Conversely, when the signal $B_0$ at the digital selector line 344 is low (e.g., binary 0), the input line 341*a* may be electrically connected to the output line 341*b* via the phase delay line 343*b*.

Figure 3B:
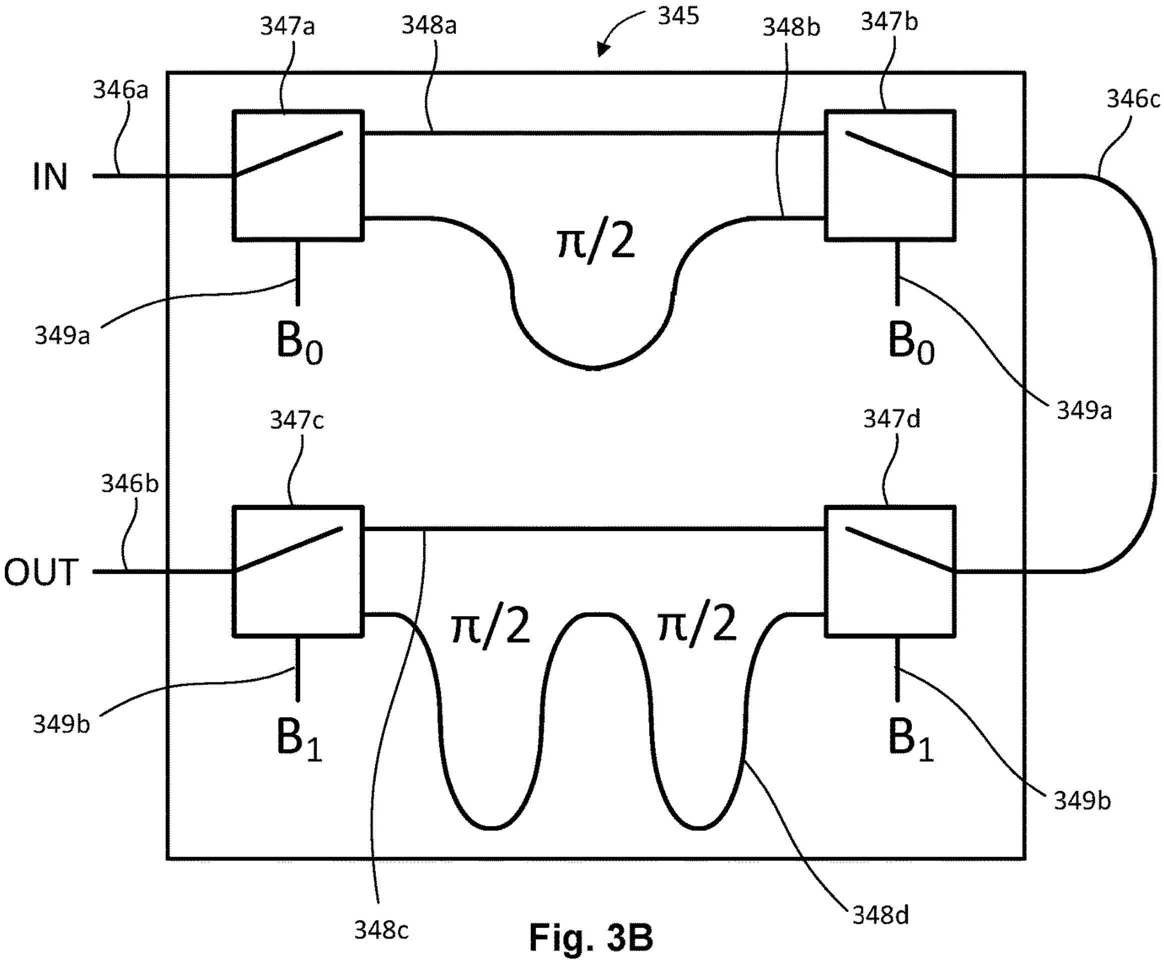
FIG. 3B illustrates an example multiplexer for two-bit selection among four phases implemented with traces of varied lengths.

FIG. 3B illustrates an example multiplexer 345 for two-bit selection among four phases implemented with traces of varied lengths. The multiplexer 345 may be implemented, for example, by cascading two one-bit two-phase multiplexers such as the multiplexer 340.

The multiplexer 345 includes an input line 346*a*, an output line 346*b*, a connecting line 346*c*, four single-pole double-throw switches 347*a-d*, four phase delay lines or, simply, delay lines 348*a-d*, and digital selector lines 349*a,b*. The phase delay lines 348*a-d* may be implemented as traces on a suitable substrate. In one implementation, the trace 348*a* and the trace 348*c* may be of equal lengths, while the trace 348*b* may have extra length to implement a π/2 phase delay at an operating frequency, and the trace 348*d* may have extra length to implement a π phase delay at the operating frequency.

In operation, binary digital logic signals $B_{0,1}$ applied to the digital selector lines 349*a,b* may select among four possible phase delays between the input line 346*a* and the output line 346*b*. More specifically, the binary digital logic signal $B_0$ controls the switches 347*a, b* to select between the delay lines 348*a,b* to make an electrical connection between the input line 346*a* and the connecting line 346*c*. On the other hand, the binary digital logic signal $B_1$ controls the switches 347*c,d* to select between the delay lines 348*c,d* to make an electrical connection between the connecting line 346*c* and the output line 346*b*.

In one operating mode, a (0, 0) two-bit combination (of $B_0$, $B_1$) applied to the digital selector lines 349*a,b* may connect the input line 346*a* to the output line 346*b* via the delay lines 348*a* and *c* having, in combination, a nominally zero phase delay. In another operating mode, a (1, 0) two-bit combination (of $B_0$, $B_1$) applied to the digital selector lines 349*a,b* may connect the input line 346*a* to the output line 346*b* via the delay lines 348*b* and *c* having, in combination, a π/2 additional phase delay. In yet another operating mode, a (0, 1) two-bit combination (of $B_0$, $B_1$) applied to the digital selector lines 349*a,b* may connect the input line 346*a* to the output line 346*b* via the delay lines 348*a* and *d* having, in combination, a π additional phase delay. Finally, a (1, 1) two-bit combination (of $B_0$, $B_1$) applied to the digital selector lines 349*a,b* may connect the input line 346*a* to the output line 346*b* via the delay lines 348*b,d* having, in combination, a 3π/2 additional phase delay.

In the manner described with reference to FIG. 3B, two bits can control selection among four possible phase delays. It may be readily demonstrated that N selector bits may select among 2" phase delays. Alternatively, in some implementations, and input line and an output line may be connected via a continuously tunable phase delay.

Figure 4A:
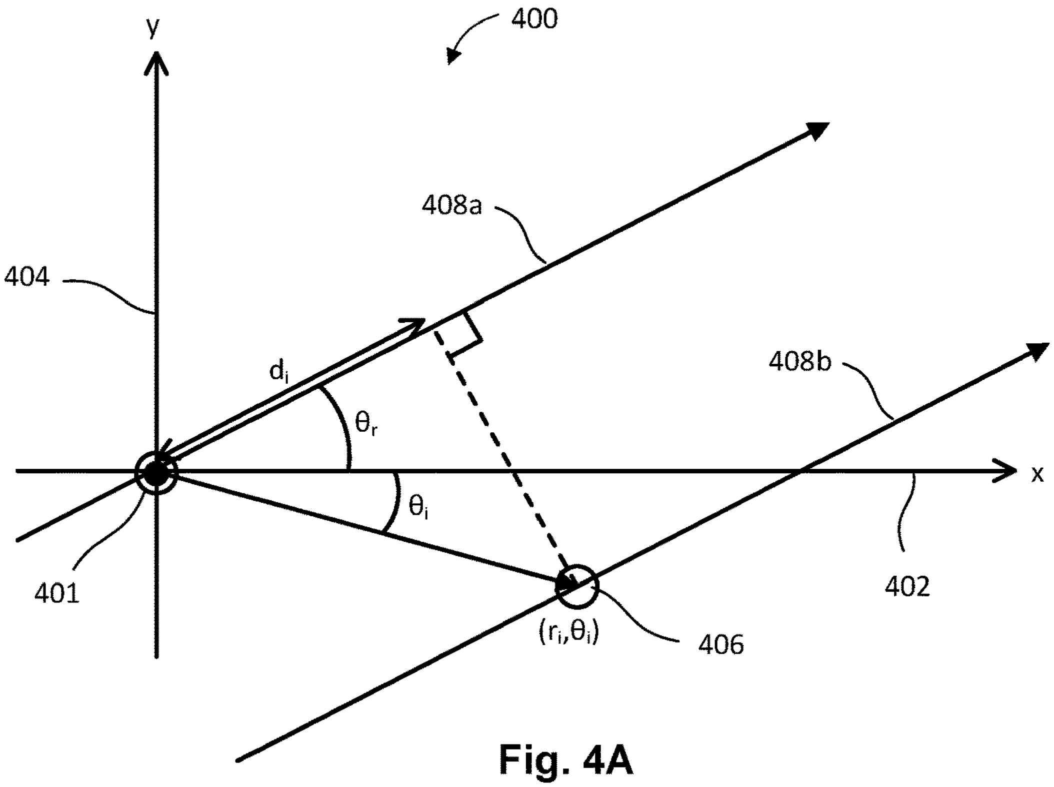
FIGS. 4A-B illustrate geometry for determining phases of antenna elements based on antenna element location and direction or radiation.
Figure 4B:
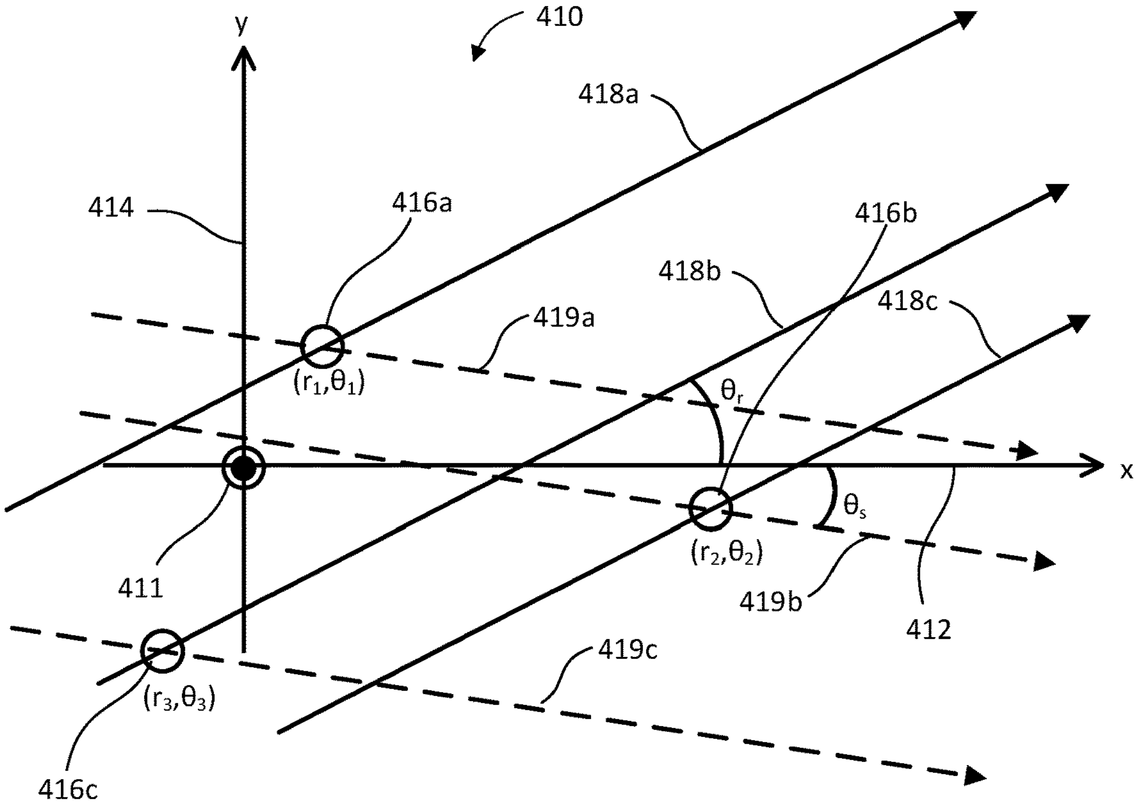

FIGS. 4A-B illustrate geometry for determining phases of antenna elements in a steerable antenna device (e.g., device 100) based on antenna element location and direction or radiation. It should be noted that, wherever a radiation direction is described below, the same discussion may be applicable to the direction of reception. That is, due to the reciprocity property of electromagnetic propagation, antenna patterns (i.e., gain as a function of direction) for transmitting and receiving are equivalent.

In a coordinate system 400 of FIG. 4A, centered, for example, around a central feed point 401, serving as the origin, with Cartesian coordinate axes 402 and 404, a phase of a radiating element 406 (e.g., an i-th element out of a set of N elements) element relative to the central feed point 401 may be computed for any radiation direction. For any radiation direction and wavelength, the position-dependent phase delay for the element 406 is uniquely determined by the location of the element 406, given by coordinates $(r_i, \Theta_i)$ in the coordinate system 400. For example, for the radiation direction indicated by parallel rays 408*a,b* and specified by the direction angle, $\Theta_r$, with respect to the x-axis 402, the radiation phase delay of the element 406 is given by the equation $$\phi_i = -2\pi d_i/\lambda,$$

where $d_i$ is a delay distance between the element 406 and the origin 401 along the direction of propagation (e.g., given by ray 408*a*) and λ is the wavelength. The delay distance, in turn, may be computed as $$d_i = r_i \cos(\Theta_r - \Theta_i).$$

Thus, the radiation phase delay may be written as $$\phi_i(\Theta_r) = -2\pi r_i \cos(\Theta_r - \Theta_i)/\lambda.$$

In a coordinate system 410 of FIG. 4B, centered around a central feed point 411, and with Cartesian coordinate axes 412 and 414, radiating elements 416*a-c* are located at respective coordinates $(r_1, \theta_1)$, $(r_1, \theta_1)$, and $(r_3, \theta_3)$. The radiating elements 416*a-c* have respective phases, $\phi_i$, relative to the central feed point 411 for any radiation direction, as described with reference to FIG. 4*a*. The phases for each of the elements with respect to the center 411 in a direction designated by rays 418*a-c* may be different from the corresponding phases in a direction designated by rays 419*a-c*.

The steerable antenna device, at which the elements 416*a-c* are disposed, may add an adjustable phase delay, $\alpha_i$, to each of the elements 416*a-c*, to generate, through interference, an array factor corresponding to any given direction. The array factor, AF, for a given (by $\Theta_r$) radiation direction may be determined as:

$$AF(\Theta_r)=\Sigma_{i=1}^{N}e^{j(\phi_i(\Theta_r)+\alpha_i)},$$

where $j=\sqrt{-1}$. The magnitude of the array factor, $|AF(\Theta_r)|$, determines gain as a function of direction, i.e., a radiation pattern, of an array of isotropically radiating antenna elements (e.g., elements 416*a-c* implemented as monopole or dipole antennas).

As described above, the steerable antenna device may select added delays $\alpha_i$ from an array of predetermined delays (e.g., using MUXs and delay lines). In some implementations, the delays may come from a set of $M=2^N$ possible delays, where N is the number of bits required to select a delay using a MUX and may be referred to as a resolution of delay selection. The value of N may be 1, 2, 3, 4, 5, 6 or any other suitable integer. In some implementations the number of different predetermined phases for each of antenna element may be an integer not represented by a power of 2, the number of possible phases may be 3, 5, 6, 7, 9, or any other suitable integer. The device may include appropriate switches, such as single-pole triple throw in selecting among possible phases. Still in other implementations the added phase may be continuously tunable.

An antenna device (e.g., the device 100) may use a controller (e.g., the controller 160) to compute a suitable additive phase for each of the elements in the array. In some implementations, the controller may choose the phases to maximize the array factor in a particular direction. Additionally or alternatively, the controller may compute the phases to minimize the array factor in a particular direction. The controller may compute optimal phases and then round each phase to the nearest available phase from the predetermined set. The controller may change the phases of the antenna elements at a suitable rate to steer or reconfigure the radiation pattern of the antenna device. The rate may be determined by switching delays of switches implementing the MUXs. The delays may be 0.1, 0.2, 0.5, 1, 2, 5, 10, 20, 50, 100, 200, 500, 1000, 2000, 5000 ns or any other suitable switching delays. It should be noted that the antenna radiation pattern need not switch at the maximum rate of the switches and may be held constant for any suitable length of time (e.g., from fractions of a nanosecond to hours or even days).

Figure 5A:
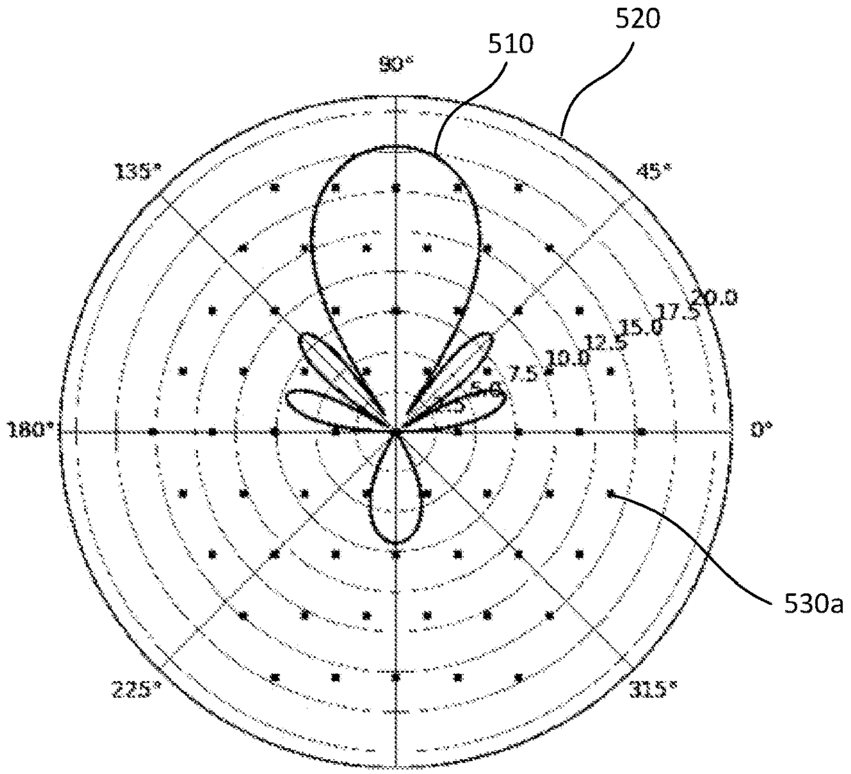
FIGS. 5A-B illustrate radiation patterns of an example regular hexagonal antenna array with 6-bit and 2-bit phase resolution, respectively.
Figure 5B:
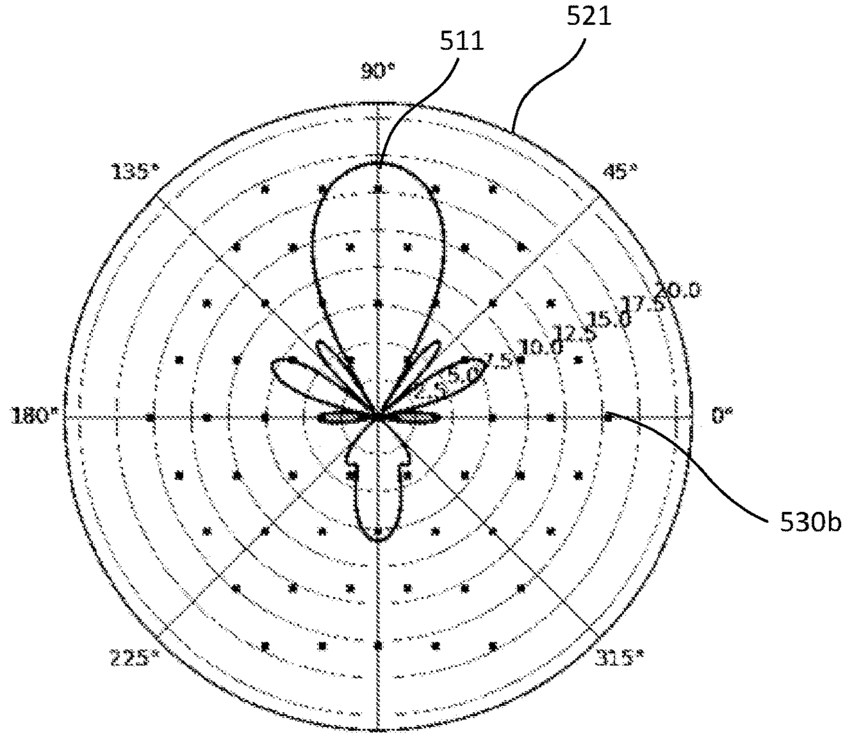

FIGS. 5A,B illustrate radiation patterns 510 and 511 of an example regular hexagonal antenna array with 6-bit (in FIG. 5A) and 2-bit (in FIG. 5B) phase resolution. That is, 64 (in the case of 6-bit resolution) or only 4 phases (in the case of 2-bit resolution) in the set of predetermined phases. The radiation patterns are shown in polar coordinate grids 520 and 521, and the hexagonal array is illustrated as a set of dots representing antenna elements (e.g., elements 530*a, b*). The antenna radiation patterns 510 and 511 of similar size main lobes (at) 90° and somewhat different unwanted secondary lobes (e.g., at 270°). A person skilled in the art would recognize that using a 2-bit resolution incurs a penalty in the main lobe and the secondary lobe when using only four phases (2-bit resolution), but the penalties are small (e.g., less than 20% for the main lobe).

Figure 6A:
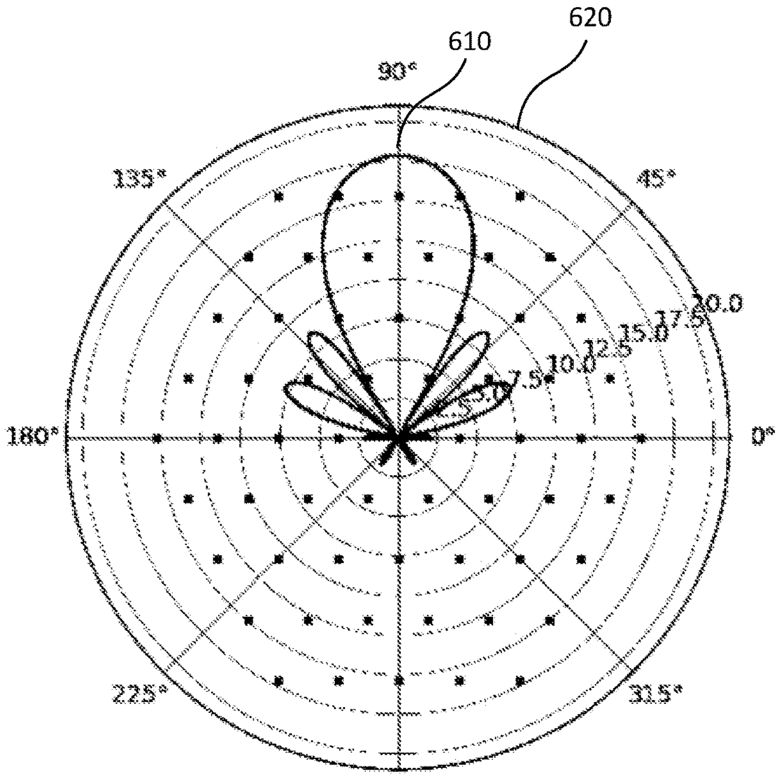
FIGS. 6A-B illustrate radiation patterns of an example regular hexagonal antenna array with 6-bit and 2-bit phase resolution, respectively, and random phase offsets at antenna elements.
Figure 6B:
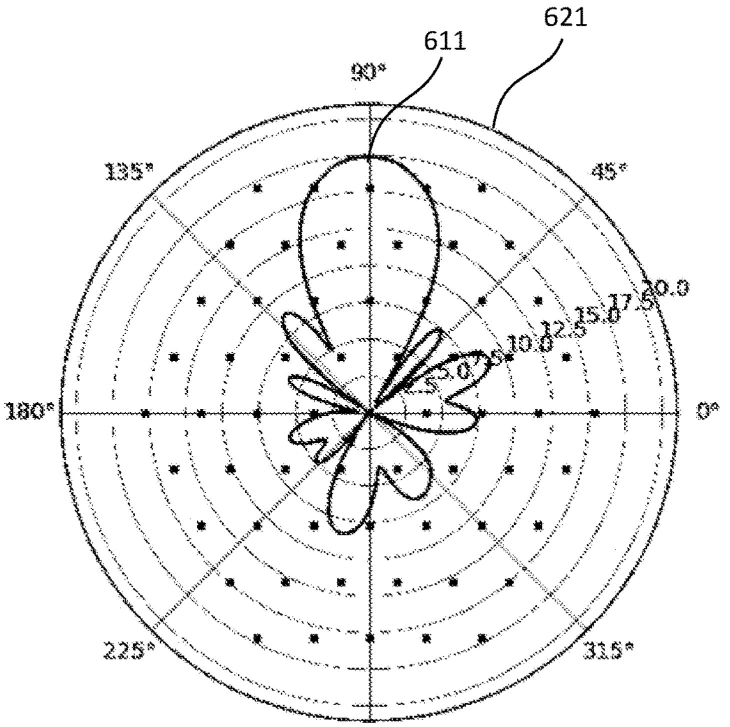

FIGS. 6A,B illustrate radiation patterns of an example regular hexagonal antenna array with 6-bit and 2-bit phase resolution, respectively, and random phase offsets at antenna elements. As in FIGS. 5A,B there radiation patterns 610 and 611 are illustrated within coordinate systems 620 and 621. An array pattern is illustrated with dots. While the main lobes of the radiation patterns 610 and 611 are nearly the same, the secondary lobes may be better reduced when using a 6-bit resolution for phases.

Figure 7A:
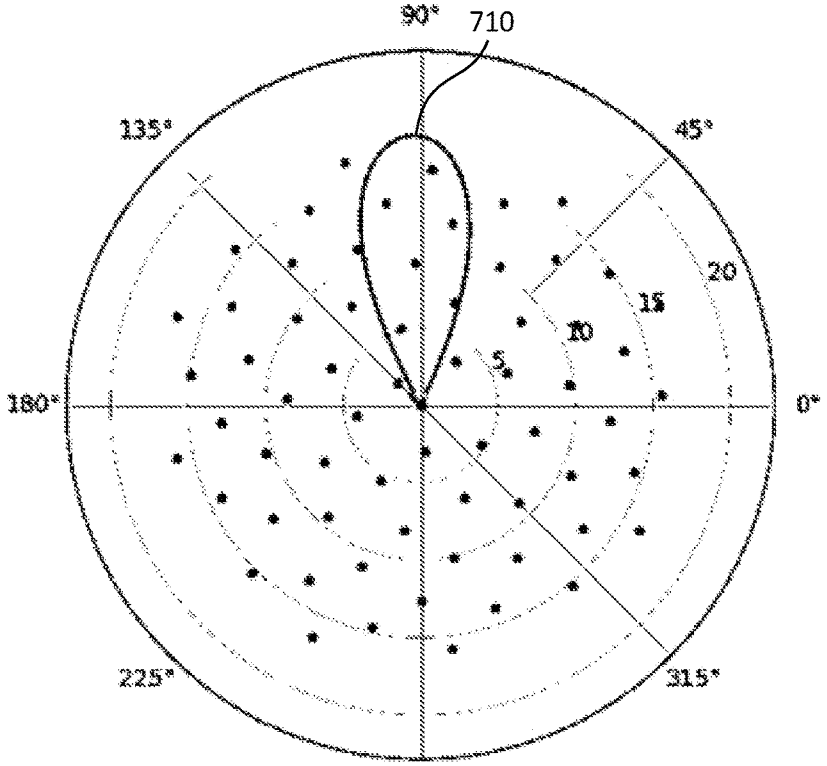
FIG. 7A illustrates a single-direction radiation pattern of a directionally-disordered quasi-uniform antenna array with 2-bit phase resolution.

FIG. 7A illustrates a single-direction radiation pattern 710 of a directionally-disordered quasi-uniform antenna array (e.g., array 200) with 2-bit phase resolution. In comparison to the radiation patterns 510, 511, 610, and 611 of a regular hexagonal array, the radiation pattern of the directionally disordered quasi-uniform antenna array has drastically reduced magnitudes of secondary lobes. Moreover, the reduction of secondary lobes may be achieved with a 2-bit resolution of phases. While even more suppression of secondary lobes may be achieved with a higher resolution, the higher resolution may require the increased complexity of switching in the MUXs, which in turn may lead to higher signal losses within the switching networks.

Figure 7B:
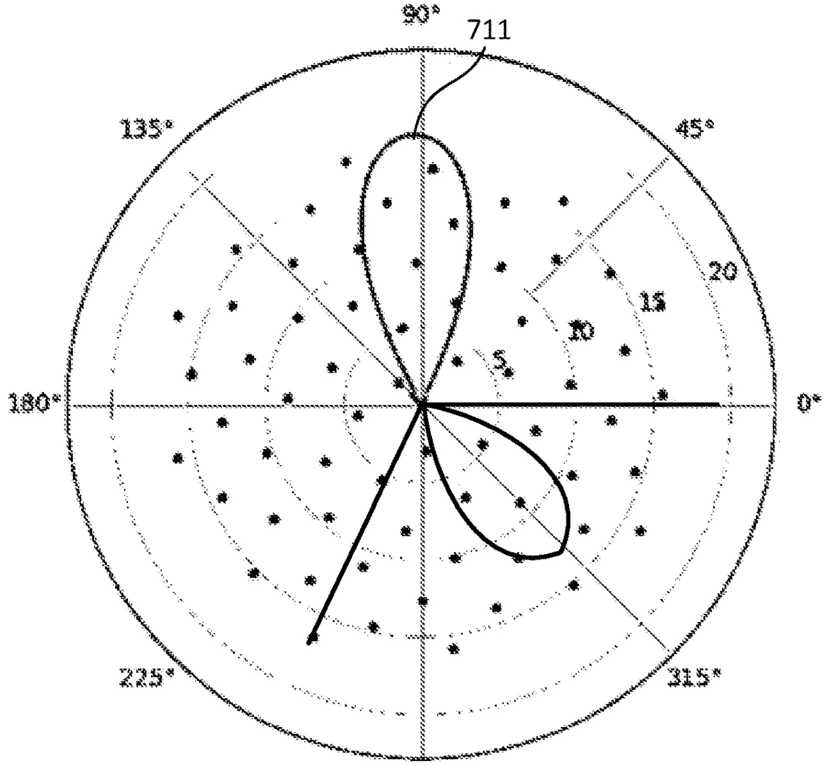
FIG. 7B illustrates a dual-direction radiation pattern of a directionally-disordered quasi-uniform antenna array with 2-bit phase resolution.

FIG. 7B illustrates a dual-direction radiation pattern 711 of a directionally-disordered quasi-uniform antenna array (e.g., array 200) with 2-bit phase resolution. The array may be a part of an antenna device (e.g., device 100). A controller of the device may configure the array to simultaneously radiate into two or more directions. The phases may be adjusted to produce a lobe at 315° in addition to the lobe at 90°, as illustrated in FIG. 7B. In general, the array may be configured to radiate and/or be directed for reception in any suitable number of independently-selected directions simultaneously. More generally, the device controller may configure array phases to conform to a desired radiation pattern. In some implementations the desired radiation pattern may include one or more nulls (i.e., minima) in one or more prescribed directions. In other implementations, the device controller may select phases to broaden or narrow one or more lobes of the radiation pattern.

In some implementations, configuring an array for radiation in multiple directions may include partitioning an array by assigning one direction to some antenna elements and another direction to other antenna elements. The partitioning may be according to regions (e.g., sectors of a circle), random assignments of antenna elements to different directions, or following any other suitable algorithm. In other implementations, the phases of all antenna elements may be simultaneously optimized to achieve a desired radiation pattern. The optimization may follow a gradient descent or any other suitable algorithm. Furthermore, an initial point of the optimization may be based on the phases obtained from a partitioned array implementation of a multi-directional radiation pattern.

Figure 8A:
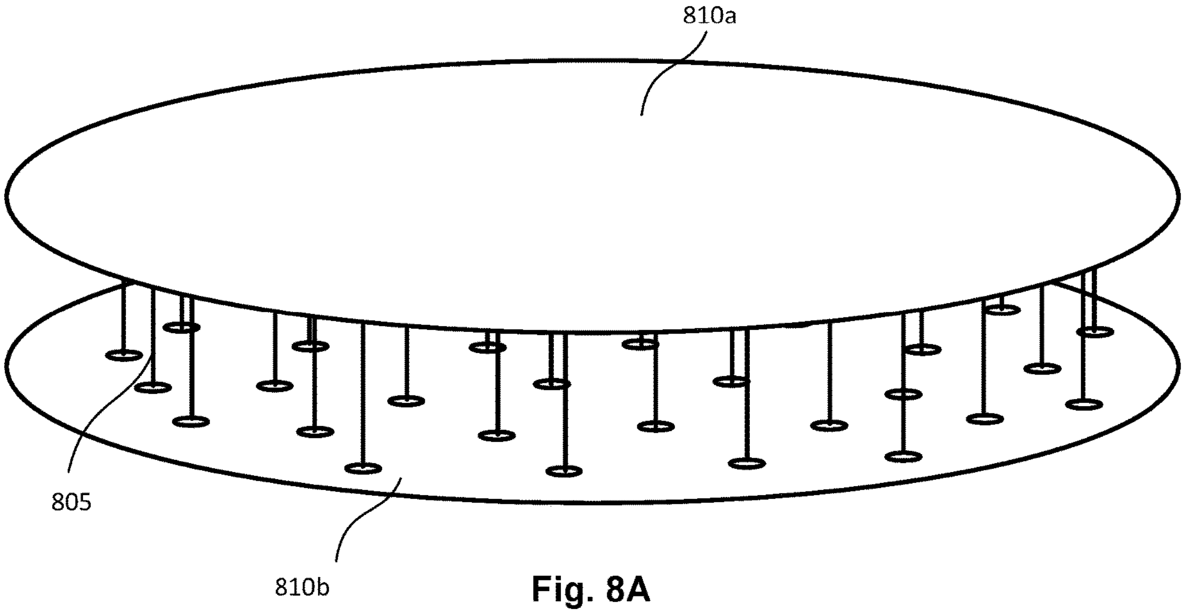
FIGS. 8A-B illustrate, respectively, a perspective and a side view of a directionally-disordered quasi-uniform antenna array of monopoles between two substrates.
Figure 8B:
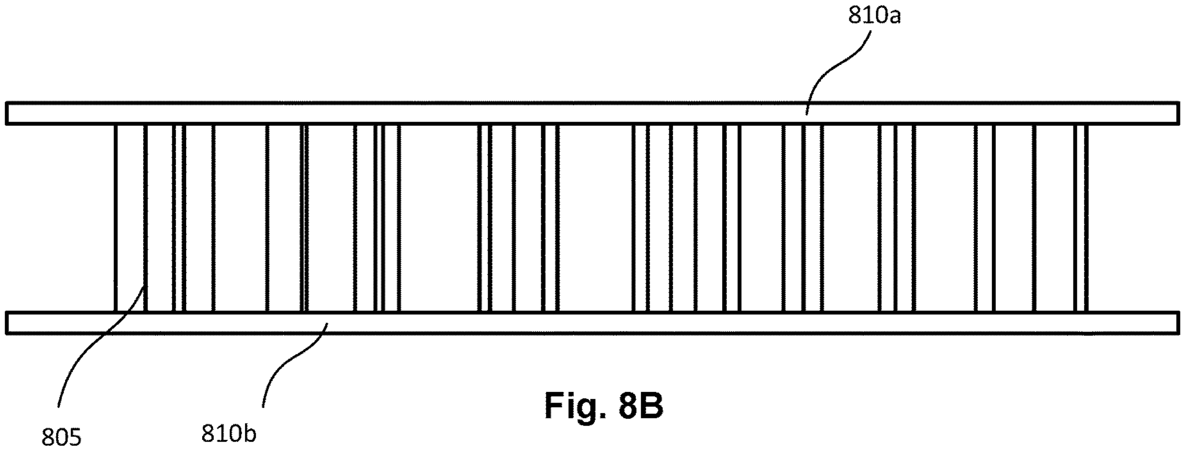

FIGS. 8A,B illustrate, respectively, a perspective and a side view of a directionally-disordered quasi-uniform antenna array (e.g., array 200) of monopoles (e.g., monopole 850) between two substrates 810*a,b*. In other implementations, the array elements may be dipoles, as described above. As can be seen, the directionally-disordered quasi-uniformity in two dimensions may lead to a non-uniform projection of the array in one dimension. The non-uniform projection of the array may be compensated by additive phases in one or more chosen directions. On the other hand, the one dimensional non-uniformity in other directions leads to randomization of phases in said directions to reduce secondary lobes, as seen in FIGS. 7A,B.

In some implementations the substrates 810*a,b* may both be conductive. In other implementations, one or more of the substrates may be constructed from dielectric materials. Generally, a conductive surface may act as a ground plane, i.e., have a nominally zero voltage difference with respect to other ground points. At least a portion of the surface of one of the substrates 810*a,b* may thus act as a primary ground plane with a flat circular shape. In some implementations, at least a portion of the surface of the other substrate may act as a secondary ground plane. Alternatively, a conductive surface may be floating, i.e., the voltage may be allowed to vary in response to, for example, induced currents. Still alternatively, at least some points on a conductive surface may be connected to a fixed voltage, different from the ground. The two conductive surfaces disposed at the substrates 810*a,b* may, in a sense, form a finite parallel plate waveguide. The conductive surfaces, and, therefore, the parallel plate waveguide may have rotational symmetry around a center point.

More generally, two conductive surfaces (e.g., of substrates) sandwiching (disposed at the ends of) antenna elements, need not be flat. For example, they may be in a shape of a dome, i.e., a surface of revolution produced by rotating a continuous function around an axis of rotation. Such surface-generating functions are illustrated as cross-sections of surfaces in FIGS. 9B (conical dome shape) and 10A,B (a truncated conical dome shape and a paraboloid dome shape, respectively). The two dome-shaped conductive surfaces may be parallel to each other, forming, in a sense, a curved parallel plate waveguide. Monopole or dipole elements, sandwiched between the two surfaces, may be perpendicular to the surface, or, alternatively, parallel to each other. In other implementations, the antenna elements need not be uniformly parallel to each other, nor perpendicular to the surfaces.

Figure 9A:
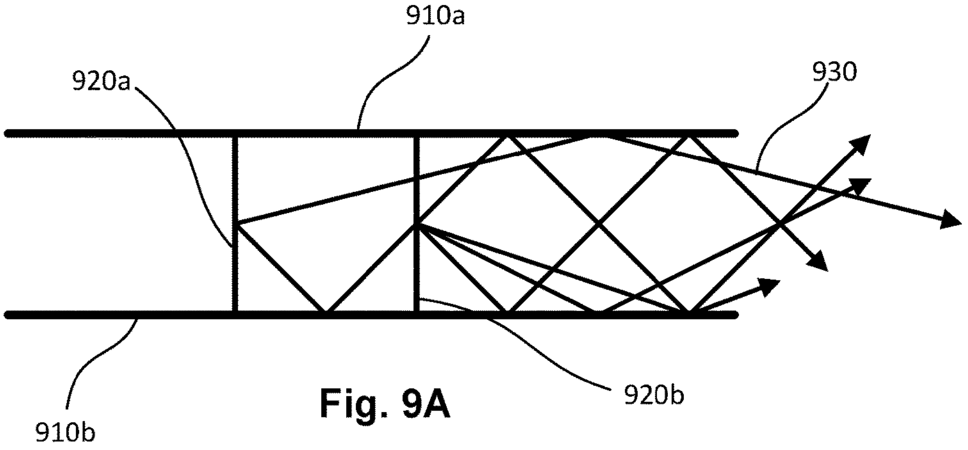
FIG. 9A illustrates a ray representation of radiation from multiple antenna elements disposed between two finite planar conductive surfaces.

FIG. 9A illustrates a ray representation of radiation from multiple antenna elements disposed between two finite planar conductive surfaces 910*a,b* which may be ground planes implemented as substrates or as coatings on substrates. Only two antenna elements 920*a,b* are illustrated to avoid clutter. Rays (e.g., ray 930), representing plane waves, emitted by the two antenna elements 920*a,b* may be reflected by the conductive surfaces 910*a,b*. Additional phases accumulated through multiple bounces may result in destructive interference of waves radiated by multiple antenna elements. In this manner, the two conductive substrates may limit the angular extent of radiation (e.g., along the axis perpendicular to the substrates), confining a radiation pattern lobe close to the horizontal plane, for example.

Figure 9B:
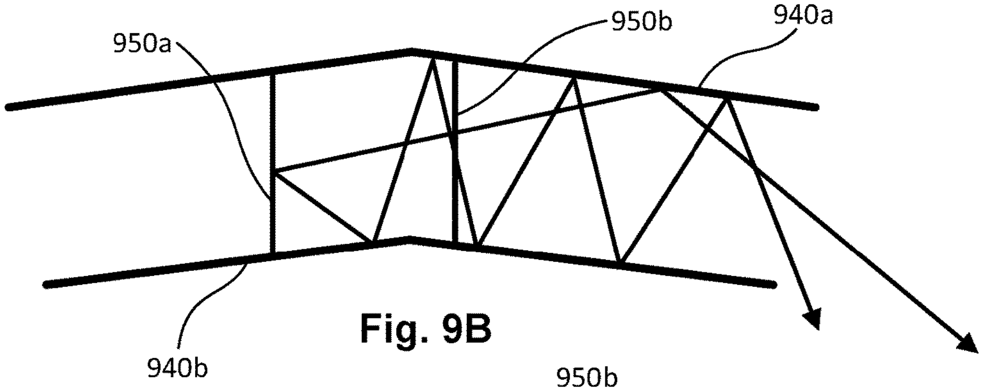
FIG. 9B illustrates a ray representation of radiation from multiple antenna elements disposed between two finite conical conductive surfaces.

FIG. 9B illustrates a ray representation of radiation from multiple antenna elements disposed between two finite conical conductive surfaces 940*a,b*, which again, may be implemented as substrates or coatings on substrates. Again, only two antenna elements 950*a,b* are illustrated to avoid clutter. In practice, many antenna elements may be disposed between the two surfaces 940*a,b* to implement a steerable antenna device (e.g., device 100). The multiple bounces of rays emitted from the antenna elements 950*a,b* randomize phase for emissions that angularly deviate from the planes of the conductive surfaces, confining the main radiation lobe along the conical extended surface.

Figure 10A:
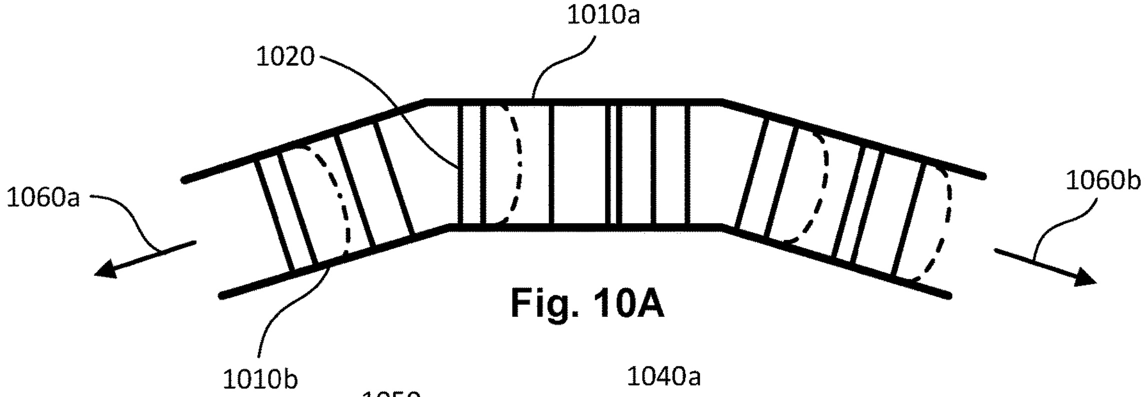
FIG. 10A-B illustrate a guided mode representation of radiation from multiple antenna elements disposed between and perpendicular to two finite dome-shaped conductive surfaces.
Figure 10B:
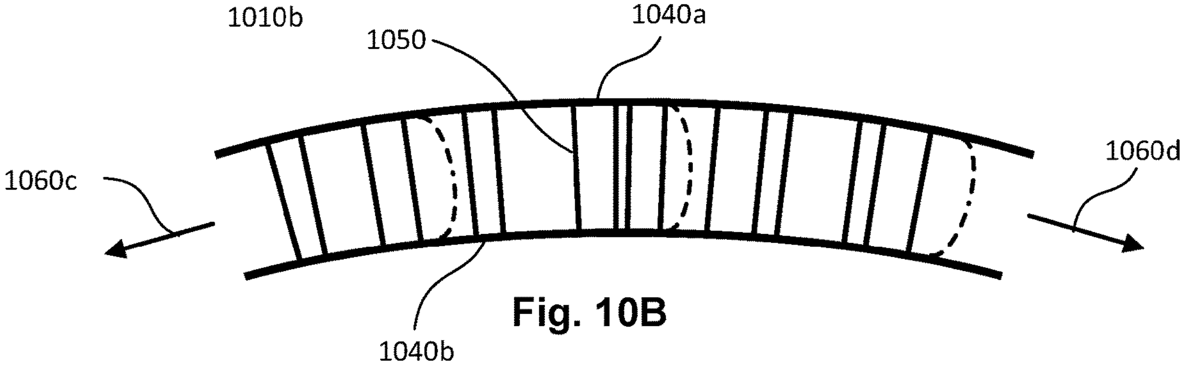

FIG. 10A-B illustrate a guided mode representation of radiation from multiple antenna elements (e.g., elements 1020 and 1050) disposed between and perpendicular to two finite dome-shaped conductive surfaces (1010*a,b* in FIG. 10A and 1040*a,b* in FIG. 10B). The conductive surfaces 1010*a,b* and 1040*a,b* may be implemented as substrates or coatings on substrates. FIGS. 10A,B can be thought of as a cross-section of a three-dimensional array, such as the one illustrated in FIG. 8A, but with disk-shaped substrates 810*a,b* replaced by dome-shaped substrates. These three-dimensional dome-shaped surfaces can be obtained as revolution surfaces of the cross-sections.

The electromagnetic fields radiated by the antenna elements may be configured to couple to modes (e.g., with field distributions illustrated with dashed lines) of the curved finite parallel plate waveguides formed by the surface pairs 1010*a,b* and 1040*a,b*. The guided modes may then diffract outside of the parallel plate waveguides, with the peak of the radiation pattern along parallel to the waveguide direction at the edge of the domes, as illustrated by arrows 160*a-d*.

Figure 11A:
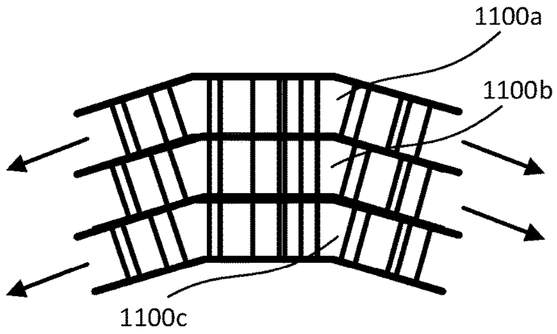
FIGS. 11A-B illustrate example stacked configurations of multiple steerable antenna devices.
Figure 11B:
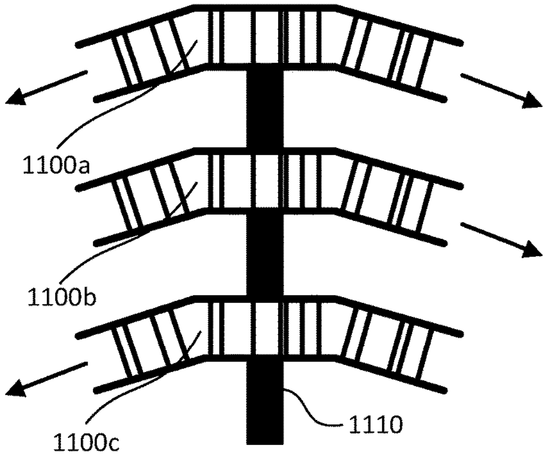

FIGS. 11A-B illustrate example stacked configurations of multiple steerable antenna devices. In FIG. 11 a steerable antenna devices 1100*a-c* are stacked directly on top of each other. The devices 1100*a-c* may be implemented with the antenna array configurations illustrated in FIG. 10A. As discussed above, one or both of the substrates on top and bottom of antenna elements may serve as ground planes. In this configuration, a top substrate of the device 1100*c* may serve as the bottom substrate of the device 1100*b* and the top substrate of the device 1100*b* may serve as the bottom substrate of 1100*a*. In the configuration of FIG. 11B the devices 1180 3C are separated in the axial direction along a post 1110. In some configurations the axial separation may reduce electrical interference among the devices 1100*a-c*. Although the examples in FIGS. 11A and B are illustrated with the steerable antenna device configuration illustrated in FIG. 10A, any shape of a steerable antenna device such as the ones illustrated in FIG. 8A, 8B, 9A, 9B, or 10B or any other suitable configurations and shapes of substrates may be used.

The devices 1100*a-c* may be configured to transmit and or receive at the same frequency or, in some implementations, at different frequencies. Furthermore each of the devices 1100*a-c* may be configured to transmit in a different direction.

Figure 11C:
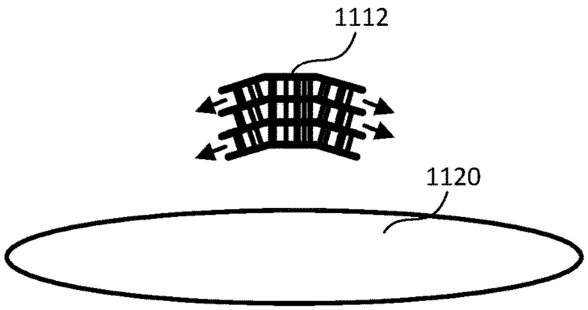
FIG. 11C illustrates a stack of devices configured to cover a coverage area

FIG. 11C illustrates a stack of devices 1112 configured to cover a coverage area 120. Due to the shapes of conductive substrates, particularly in the dome shaped antenna devices and the elevation of the stack 1112 above ground, radiation transmitted and, or received by each of the devices in the stack 1112, i.e., radiation patterns, may not extend substantially beyond the coverage area 1120. Each of the devices in the stack 1112 may be coupled to a corresponding radio transmitter and/or receiver. The resulting configuration may form a multi-radio node of a mesh network.

Figure 12A:
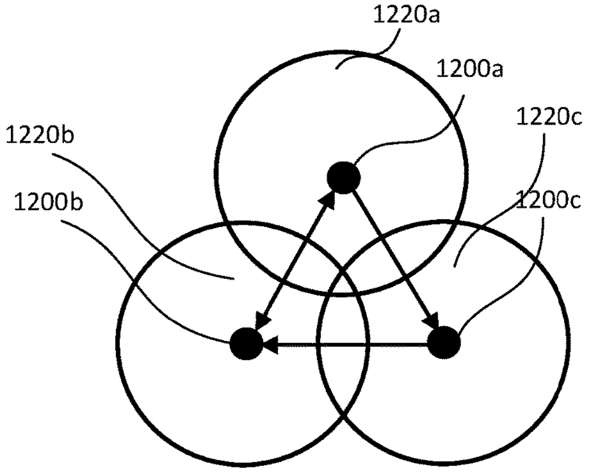
FIGS. 12A-B illustrate example configurations of multiple steerable antenna devices in a mesh network.
Figure 12B:
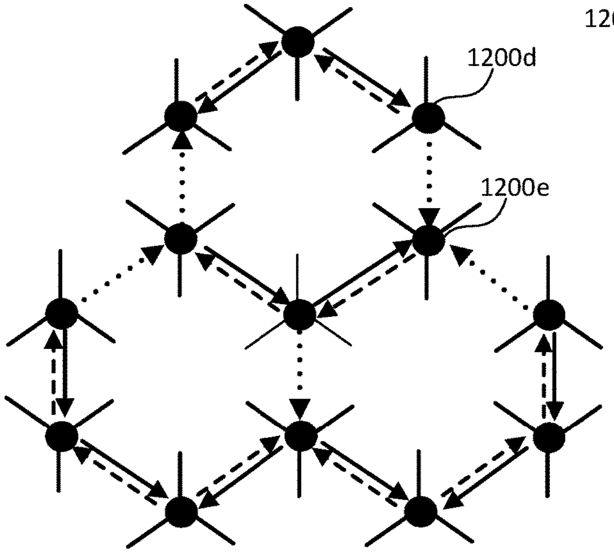

FIGS. 12A-B illustrate example configurations of multiple steerable antenna devices in a mesh network. In FIG. 12A, the nodes 1200*a-c*, each with a corresponding coverage area 1120*a-c*, are arranged in a triangle configuration. Extending the mesh in such a manner, may result in a so-called hexagonal mesh configuration, where each mesh element is adjacent to six other mesh elements forming vertices of a hexagon. In the example configuration of FIG. 12A, the node 1200*a* may transmitted to the node 1200*c*, while the node 1200C may transmit the node 1200*b* and the nodes 1200*a* and 1200*b* may be in bidirectional communication with each other. The bidirectional or full-duplex communication may be enabled by using multi-radio nodes for example with a stack (e.g., stack 1112) of steerable antenna devices.

FIG. 12B illustrates an alternative configuration of nodes in a mesh network. Only nodes 1200*d* and 1200*e* are labeled to avoid clutter. The configuration in FIG. 12 B may be referred to as a honeycomb configuration. Each node in FIG. 12 B may include a stack of antenna devices, each coupled to a different transmitter and or receiver, to enable a multi-radio mesh configuration. In the honeycomb configuration each node may be in communicative connection with three other nodes. The dotted arrows may indicate one directional communications, while dashed and solid arrows may indicate bidirectional communications. In some implementations the dotted arrows may represent the first frequency, while the dashed and the solid arrows may each represent an additional frequency.

Each of the nodes in FIG. 12 B may include a stack of antenna devices, with each device in the stack configured with a radiation pattern pointing in a different direction. Using steerable antenna devices, the mesh may be readily reconfigured should one of the nodes fail or in any other suitable configuration of the mesh.

It should be noted that the configurations in FIG. 12A and FIG. 12B are only example configurations. In some implementation a configuration might be anisotropic, with distances or angles between nodes being non-uniform from one node to another, while still maintaining a configuration where each node is in communication with six other nodes (as in FIG. 12A) or three other nodes (as in FIG. 12B). In other implementations, the mesh may be configured with each node connected to any other suitable number of nodes (e.g., 2, 4, 5, 7, 8, etc.). Furthermore, each node need not be connected to the same number of nodes as another node in the mesh. Still further, different nodes may include different numbers of steerable antenna devices in a corresponding stack.

Figure 13:
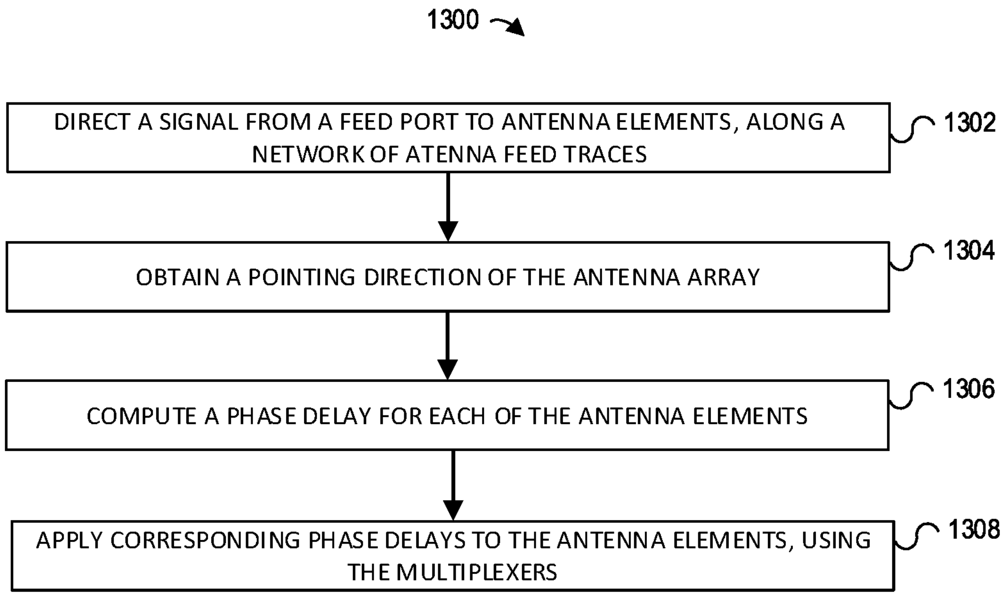
FIG. 13 illustrates an example steering method, which can be implemented in the controller of the steerable antenna device of FIG. 1.

FIG. 13 illustrates an example method 1300 for steering an antenna device, which can be implemented in the controller 160, for example. The method 1300 can be implemented in hardware, firmware, software, or any suitable combination of hardware, firmware, and software. For example, a non-transitory computer-readable medium such as an optical disc can store a set of instructions, and one or more processors in the controller 160 can execute these instructions during operation of the steerable antenna device 100. For clarity, the method 1300 is discussed below with example reference to the controller 160.

At block 1302, the controller 160 directs a signal at a certain operating wavelength from a primary feed (e.g., element 112) to antenna elements (e.g., elements 130) disposed on a substrate (e.g., element 110), along a network of antenna feed traces (e.g., elements 120). The antenna elements can form directionally-disordered, quasi-uniform two-dimensional array.

Next, at block 1304, the controller 160 obtains a pointing direction of the steerable antenna array. In some implementations, the device 100 operates in a wireless mesh network, and the controller 160 dynamically determines the pointing direction and/or beam width (i.e., angular extent of a lobe of a radiation pattern) in view of a routing decision for a data packet.

At block 1306, the controller 160 computes respective phase delays for the antenna elements, so as to generate an appropriate radiation pattern (e.g., a pattern with a main lobe aligned with the pointing direction of the antenna device). In some implementations, each phase delay is selected from a limited set (e.g., four values, eight values, 16 values) of possible phase delays, in view of the implementation of the antenna array.

At block 1308, the controller 160 can use multiplexers (e.g., elements 140) to select a phase delay from the corresponding set and apply, to each of the antenna elements, the corresponding phase delay. In the case of multi-wavelength operation of the antenna device, the controller 160 may select a corresponding time delay from the time delays corresponding to the alternative paths selected by the multiplexer.

What is claimed is:

1. A steerable antenna device comprising:

a substrate including a network of antenna feed traces connected to a primary feed port;

a quasi-uniform two-dimensional array including a plurality of antenna elements attached to the substrate, the antenna elements arranged in a directionally disordered manner to substantially minimize statistical difference between any two planar directions;

a plurality of multiplexers, configured to select, for each one of the plurality of antenna elements, a path in the network of antenna feed traces to generate a certain phase delay for the antenna element; and a controller configured to:

obtain a pointing direction of the steerable antenna array, and control the multiplexers to select, for each one of the plurality of antenna elements, the respective phase delay based on the obtained pointing direction of the steerable antenna device.

2. The antenna device of claim 1, further comprising:

a primary ground plane disposed at the substrate.

3. The antenna device of claim 2, wherein:

the substrate is flat and the primary ground plane has a circular shape.

4. The antenna device of claim 2, wherein:

the substrate has a dome shape and the primary ground plane has rotational symmetry.

5. The antenna device of claim 2, further comprising:

a secondary ground plane, wherein at least a portion of the secondary ground plane is parallel to at least a portion of the primary ground plane, to thereby form a finite parallel plate waveguide with rotational symmetry.

6. The antenna device of claim 2, wherein:

each one of the plurality of antenna elements is a monopole antenna perpendicular to the substrate.

7. The antenna device of claim 1, wherein:

each of the plurality of multiplexers includes 2N single pole double throw switches configured to select the respective phase delay from the respective set of $2^N$ possible phase delays.

8. The antenna device of claim 7, wherein:

N is 2, and the respective set of $2^N$ possible phase delays is the respective set of 4 phase delays.

9. The antenna device of claim 1, wherein:

the plurality of antenna elements of the directionally-disordered quasi-uniform two-dimensional array are disposed along a Fermat spiral at incremental azimuthal intervals determined by the Golden Ratio.

10. The antenna device of claim 9, wherein:

a distance between any first antenna element selected from the plurality of antenna elements and a second antenna element of the plurality of antenna elements, where the second antenna element is the closest antenna element of the plurality of antenna elements to the first antenna elements, is between one half of an operating wavelength and the operating wavelength.

11. A method of steering an antenna device implemented in a controller, the method comprising:

directing a signal at an operating wavelength from a primary feed port along a network of antenna feed traces disposed at a substrate to a directionally-disordered quasi-uniform two-dimensional array including a plurality of antenna elements attached to the substrate, the antenna elements arranged in a directionally disordered manner to substantially minimize statistical difference between any two planar directions and the array configured to operate at an operating wavelength;

obtaining a pointing direction of the steerable antenna array;

computing, a phase delay for each of the plurality of antenna elements; and applying, using a plurality of multiplexers and for each one of the plurality of antenna elements, the respective computed phase delay from a respective set of possible phase delays by selecting a respective path from a set of possible respective paths in the network of antenna feed traces.

12. The method of claim 11, wherein the antenna device includes:

a primary ground plane disposed at the substrate.

13. The method of claim 12, wherein:

the substrate is flat and the primary ground plane has a circular shape.

14. The method of claim 12, wherein:

the substrate has a dome shape and the primary ground plane has rotational symmetry.

15. The method of claim 12, wherein the antenna device further includes:

a secondary ground plane, with at least a portion of the secondary ground plane parallel to at least a portion of the primary ground plane, to thereby form a finite parallel plate waveguide with rotational symmetry.

16. The method of claim 12, wherein:

each one of the plurality of antenna elements is a monopole antenna perpendicular to the substrate.

17. The method of claim 11, wherein:

each of the plurality of multiplexers includes 2N single pole double throw switches configured to select the respective phase delay from the respective set of $2^N$ possible phase delays.

18. The method of claim 17, wherein:

N is 2, and the respective set of $2^N$ possible phase delays is the respective set of 4 phase delays.

19. The method of claim 11, wherein:

the plurality of antenna elements of the directionally-disordered quasi-uniform two-dimensional array are disposed along a Fermat spiral at incremental azimuthal intervals determined by the Golden Ratio.

20. The method of claim 19, wherein:

a distance between any first antenna element selected from the plurality of antenna elements and a second antenna element of the plurality of antenna elements, where the second antenna element is the closest antenna element of the plurality of antenna elements to the first antenna elements, is between one half of the operating wavelength and the operating wavelength.

* * * * *